United States Patent
Nakajima

(10) Patent No.: US 10,365,863 B2
(45) Date of Patent: Jul. 30, 2019

(54) IMAGE FORMING APPARATUS, IMAGE FORMING METHOD, AND STORAGE MEDIUM

(71) Applicant: CANON KABUSHIKI KAISHA, Tokyo (JP)

(72) Inventor: Satoru Nakajima, Moriya (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/026,681

(22) Filed: Jul. 3, 2018

(65) Prior Publication Data

US 2019/0012118 A1 Jan. 10, 2019

(30) Foreign Application Priority Data

Jul. 10, 2017 (JP) ................. 2017-134760

(51) Int. Cl.
  *G06F 3/12* (2006.01)
  *G06F 3/0482* (2013.01)
  *G06F 3/0481* (2013.01)

(52) U.S. Cl.
  CPC .......... *G06F 3/1207* (2013.01); *G06F 3/0482* (2013.01); *G06F 3/1208* (2013.01); *G06F 3/1256* (2013.01); *G06F 3/1259* (2013.01); *G06F 3/04817* (2013.01)

(58) Field of Classification Search
  None
  See application file for complete search history.

(56) References Cited

U.S. PATENT DOCUMENTS

| | | | |
|---|---|---|---|
| 2015/0055172 A1* | 2/2015 | Iida | G06K 15/4065 358/1.15 |
| 2017/0075635 A1* | 3/2017 | Maemura | H04N 1/00244 |
| 2018/0113659 A1* | 4/2018 | Matsui | G06F 3/1204 |
| 2018/0165045 A1* | 6/2018 | Hagiwara | G06F 3/1238 |

FOREIGN PATENT DOCUMENTS

JP 2007-251279 A 9/2007

\* cited by examiner

*Primary Examiner* — Thomas D Lee
(74) *Attorney, Agent, or Firm* — Canon U.S.A., Inc. IP Divison

(57) ABSTRACT

An image forming apparatus registers print jobs based on received print data and executes image formation based on a print job selected from the registered print jobs. The image forming apparatus stores a new arrival/not-new arrival state of print jobs, which enables selection of just the newly-arrived print jobs.

12 Claims, 15 Drawing Sheets

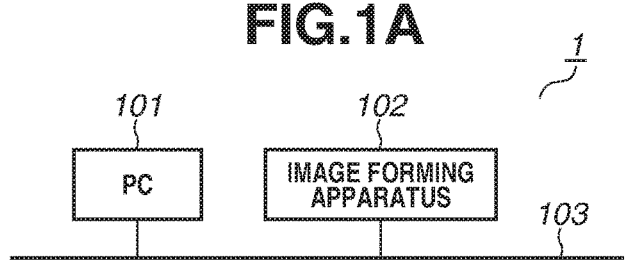
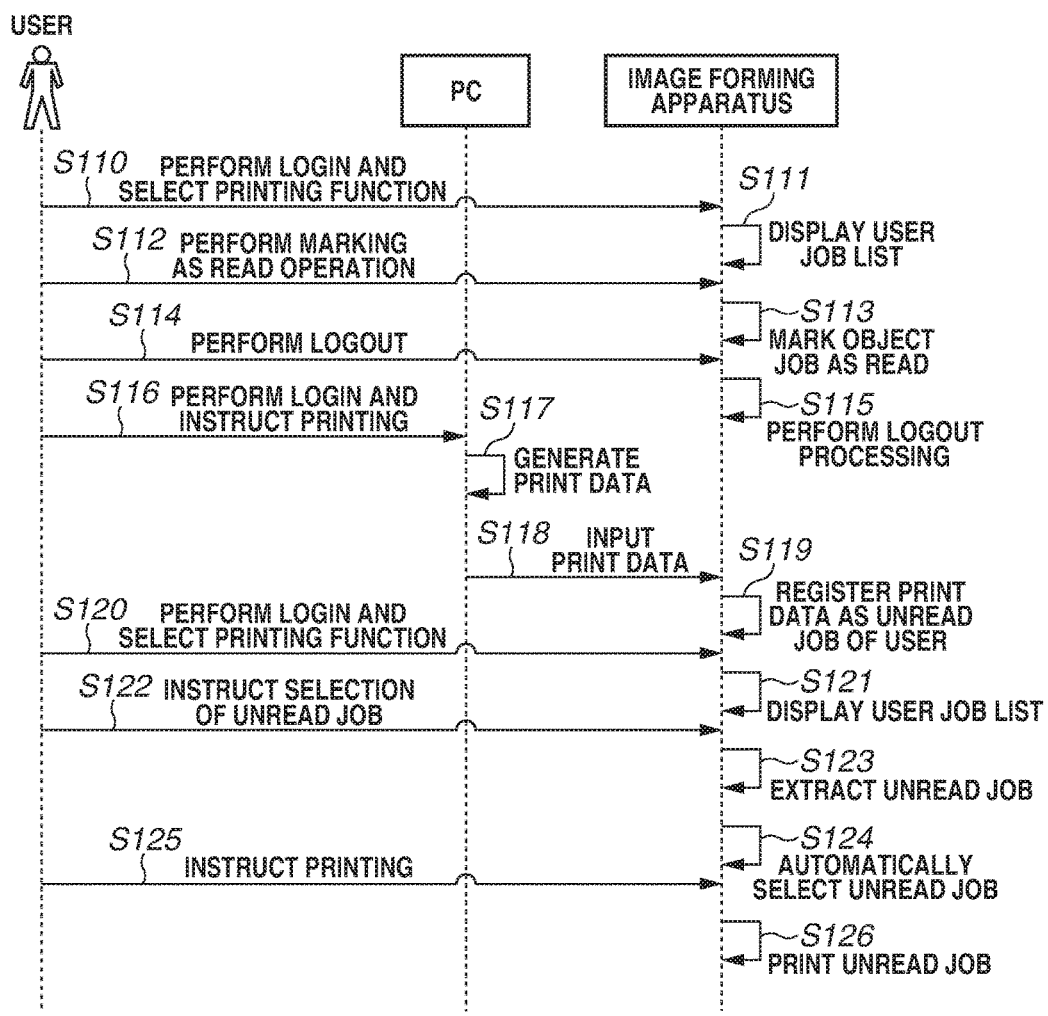

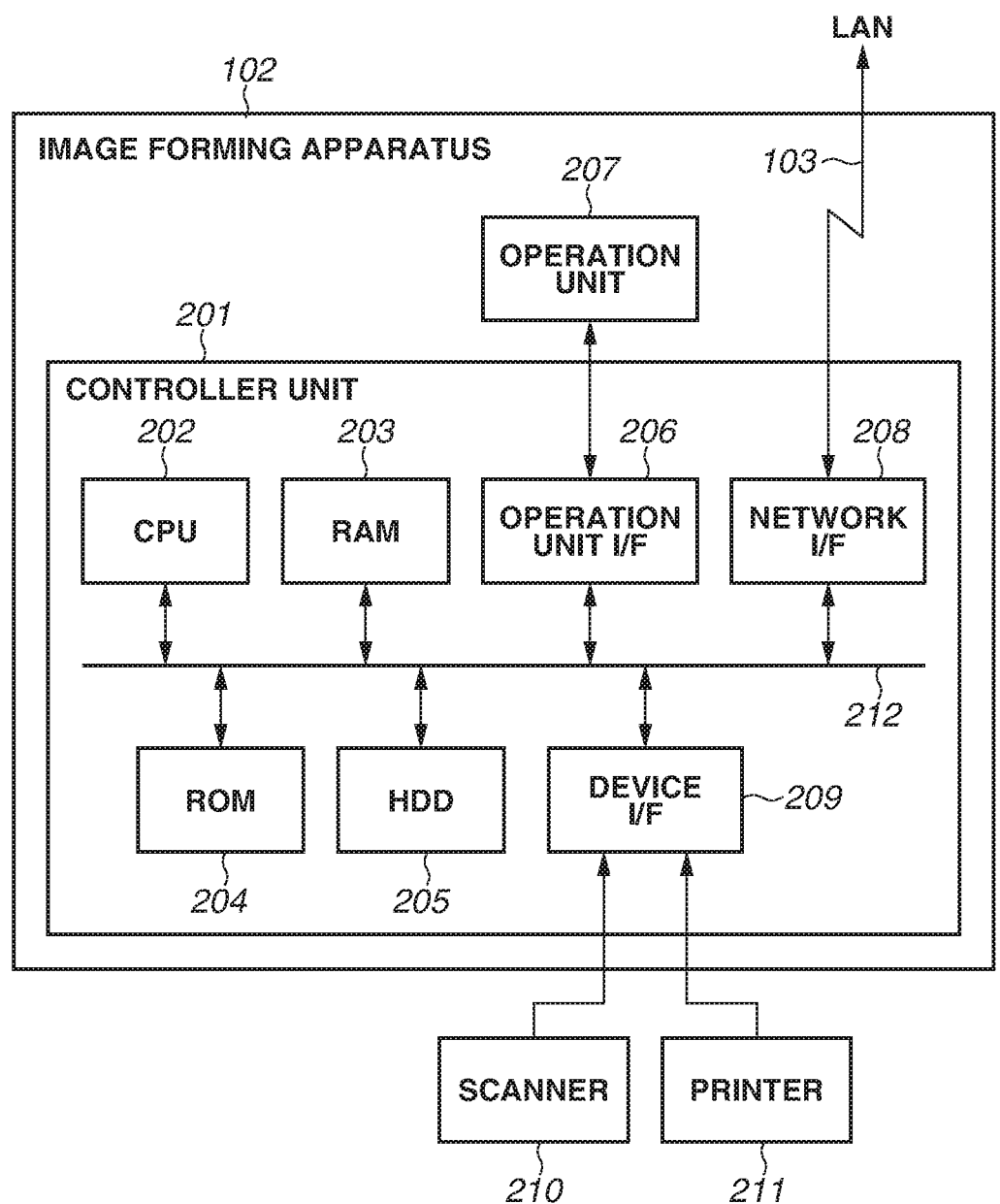

FIG.8

UserA:

| DATE | IP ADDRESS | STORAGE LOCATION | PRINT JOB NAME | PRINT SETTING | MARK AS READ |
|---|---|---|---|---|---|
| 2016/4/10 10:34:45 | 192.168.2.11 | /data/0015/xxx | AAA.txt | ONE-SIDED 1 COPY MONOCHROME | ON |
| 2016/4/20 13:50:22 | 192.168.2.11 | /data/0591/yyy | BBB.pdf | DOUBLE-SIDED 3 COPIES COLOR | ON |
| 2016/5/28 14:10:00 | 192.168.2.11 | /data/8125/zzz | CCC.doc | DOUBLE-SIDED 5 COPIES 2 in 1 COLOR | OFF |
| 2016/5/28 14:13:00 | 192.168.2.11 | /data/8126/www | DDD.pptx | ONE-SIDED 2 COPIES COLOR | OFF |

802   803   804   805   806   807

801

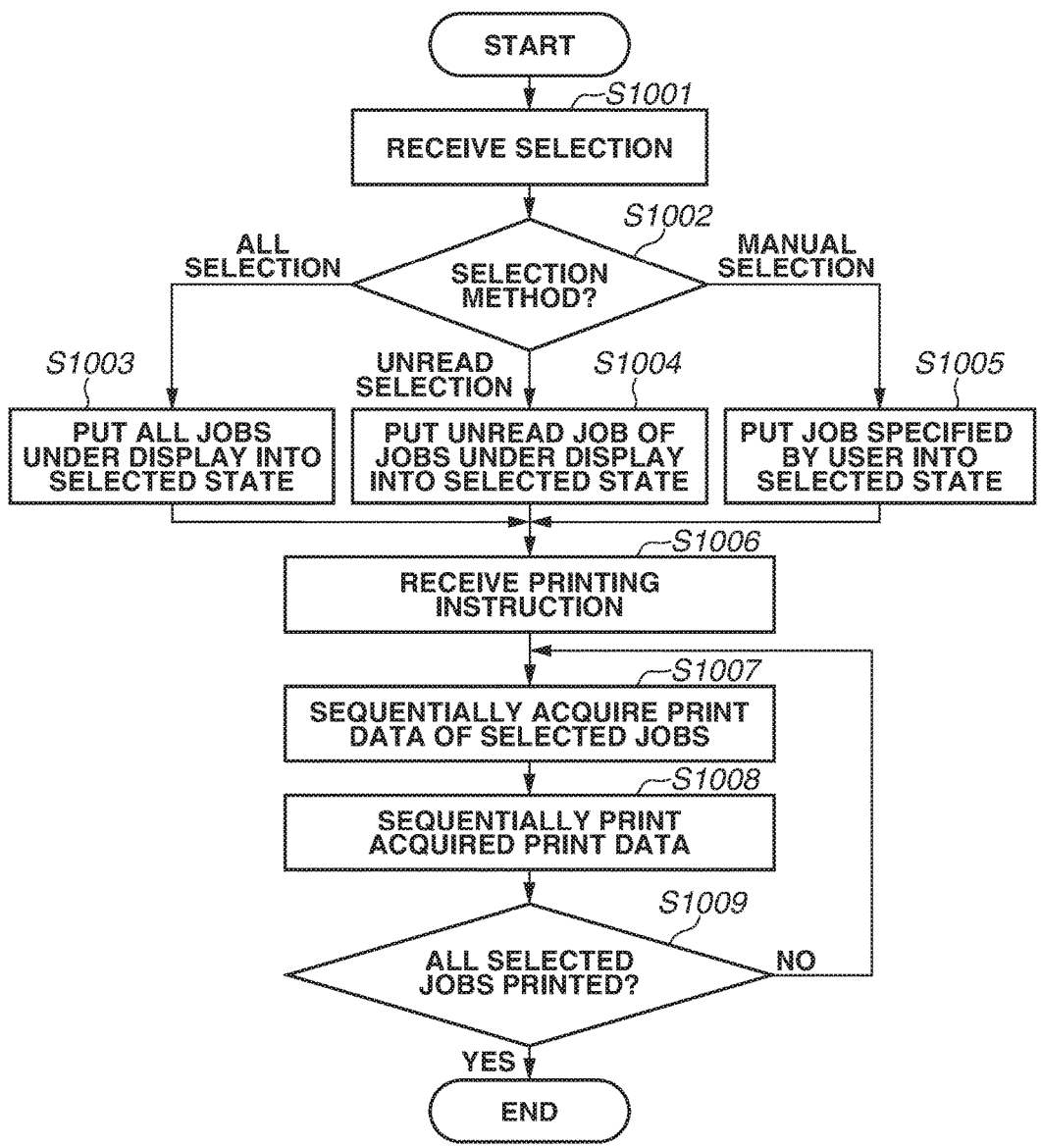

FIG.11A

PRINT JOB OF UserA — 1101

2012/4/10 10:34:45  AAA.txt  ONE-SIDED 1 COPY MONOCHROME
2012/4/20 13:50:22  BBB.pdf  DOUBLE-SIDED 3 COPIES COLOR
NEW! 2012/5/28 14:10:00  CCC.doc  DOUBLE-SIDED 5 COPIES 2 in 1 COLOR
NEW! 2012/5/30 14:13:00  DDD.pptx  ONE-SIDED 2 COPIES COLOR  1107

1111

1102  1103  1106  CHANGE SETTING  PREVIEW
SELECT ALL  SELECT NEWLY-ARRIVED JOB  DELETE  PRINT
                                         1105    1104

FIG.11B

PRINT JOB OF UserA

2012/4/10 10:34:45  AAA.txt  ONE-SIDED 1 COPY MONOCHROME
2012/4/20 13:50:22  BBB.pdf  DOUBLE-SIDED 3 COPIES COLOR
[1] 2012/5/28 14:10:00  CCC.doc  DOUBLE-SIDED 5 COPIES 2 in 1 COLOR
NEW! 2012/5/30 14:13:00  DDD.pptx  ONE-SIDED 2 COPIES COLOR

1108

CHANGE SETTING  PREVIEW
SELECT ALL  SELECT NEWLY-ARRIVED JOB  DELETE  PRINT

FIG.11C

PRINT JOB OF UserA

2012/4/10 10:34:45  AAA.txt  ONE-SIDED 1 COPY MONOCHROME
2012/4/20 13:50:22  BBB.pdf  DOUBLE-SIDED 3 COPIES COLOR
[1] 2012/5/28 14:10:00  CCC.doc  DOUBLE-SIDED 5 COPIES 2 in 1 COLOR
[2] 2012/5/30 14:13:00  DDD.pptx  ONE-SIDED 2 COPIES COLOR

1109

CHANGE SETTING  PREVIEW
SELECT ALL  SELECT NEWLY-ARRIVED JOB  DELETE  PRINT

FIG.11D

PRINT JOB OF UserA

[1] 2012/4/10 10:34:45  AAA.txt  ONE-SIDED 1 COPY MONOCHROME
[2] 2012/4/20 13:50:22  BBB.pdf  DOUBLE-SIDED 3 COPIES COLOR
[3] 2012/5/28 14:10:00  CCC.doc  DOUBLE-SIDED 5 COPIES 2 in 1 COLOR
[4] 2012/5/30 14:13:00  DDD.pptx  ONE-SIDED 2 COPIES COLOR

1110

CHANGE SETTING  PREVIEW
SELECT ALL  SELECT NEWLY-ARRIVED JOB  DELETE  PRINT

■ SETTING OF OBJECT TO BE RELEASED   USER A
FROM NEW ARRIVAL STATE

☐ RELEASE OBJECT FROM NEW ARRIVAL STATE BY LOGIN
☐ RELEASE OBJECT FROM NEW ARRIVAL STATE BY JOB LIST SCREEN
☐ RELEASE OBJECT FROM NEW ARRIVAL STATE BY DISPLAY OF JOB
☐ RELEASE OBJECT FROM NEW ARRIVAL STATE BY SELECTION OF JOB
☑ RELEASE OBJECT FROM NEW ARRIVAL STATE BY PREVIEW OF JOB

[ SET ]   [ CANCEL ]

■ SETTING OF NEW ARRIVAL/NOT-NEW   USER A
ARRIVAL OPERATION

☐ DISPLAY NEWLY-ARRIVED JOB SELECTION ICON
☐ DISPLAY NOT-NEWLY-ARRIVED JOB SELECTION ICON
☑ AUTOMATICALLY SELECT NEWLY-ARRIVED JOB
☐ AUTOMATICALLY SELECT NOT-NEWLY-ARRIVED JOB
☐ AUTOMATICALLY PRINT NEWLY-ARRIVED JOB BY LOGIN

[ SET ]   [ CANCEL ]

| USER NAME | CONDITION FOR RELEASING OBJECT FROM NEW ARRIVAL STATE | OPERATION SETTING |
|---|---|---|
| USER A | RELEASE OBJECT FROM NEW ARRIVAL STATE BY PREVIEW | AUTOMATICALLY SELECT NEW ARRIVAL |
| USER B | RELEASE OBJECT FROM NEW ARRIVAL STATE BY JOB DISPLAY | NEW ARRIVAL SELECTION ICON |

| *1301* | *1302* | *1303* | *1304* | *1305* | *1306* | *1307* | *1308* | *1309* | *1310* |
|---|---|---|---|---|---|---|---|---|---|
| JOB ID | JOB NAME | USER NAME | LOGIN | FUNCTION EXECUTION | JOB DISPLAY | JOB SELECTION | PREVIEW | PRINT | RELEASE FROM NEW ARRIVAL STATE |
| 1 | DOCUMENT 1 | USER A | ON | ON | ON | ON | ON | DONE | DONE |
| 2 | DOCUMENT 2 | USER A | ON | ON | ON | ON | OFF | DONE | NOT YET |
| 3 | DOCUMENT 3 | USER A | ON | ON | ON | OFF | OFF | NOT YET | NOT YET |
| 4 | DOCUMENT 4 | USER A | ON | OFF | OFF | OFF | OFF | NOT YET | NOT YET |
| 5 | DOCUMENT 5 | USER A | OFF | OFF | OFF | OFF | OFF | NOT YET | NOT YET |
| 6 | DOCUMENT 6 | USER A | ON | ON | ON | ON | ON | NOT YET | DONE |
| 7 | DOCUMENT 1 | USER B | ON | ON | ON | ON | OFF | NOT YET | DONE |
| 8 | DOCUMENT 2 | USER B | ON | ON | OFF | OFF | OFF | NOT YET | DONE |
| 9 | DOCUMENT 3 | USER B | ON | ON | OFF | OFF | OFF | NOT YET | NOT YET |
| 10 | DOCUMENT 4 | USER B | ON | OFF | OFF | OFF | OFF | NOT YET | NOT YET |
| 11 | DOCUMENT 5 | USER B | ON | OFF | OFF | OFF | OFF | NOT YET | NOT YET |
| 12 | DOCUMENT 6 | USER B | OFF | OFF | OFF | OFF | OFF | NOT YET | NOT YET |

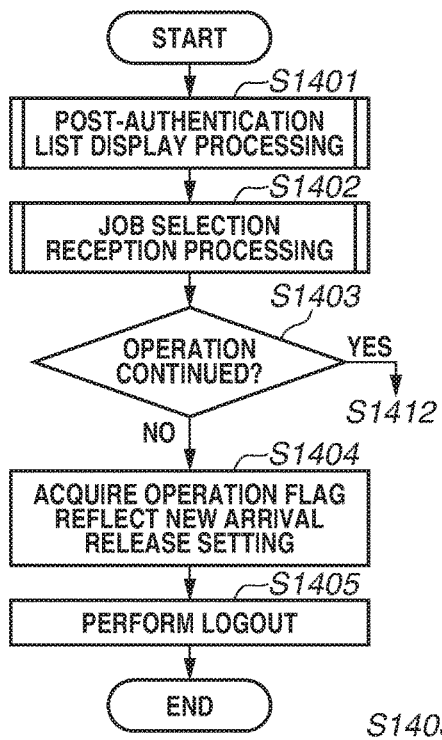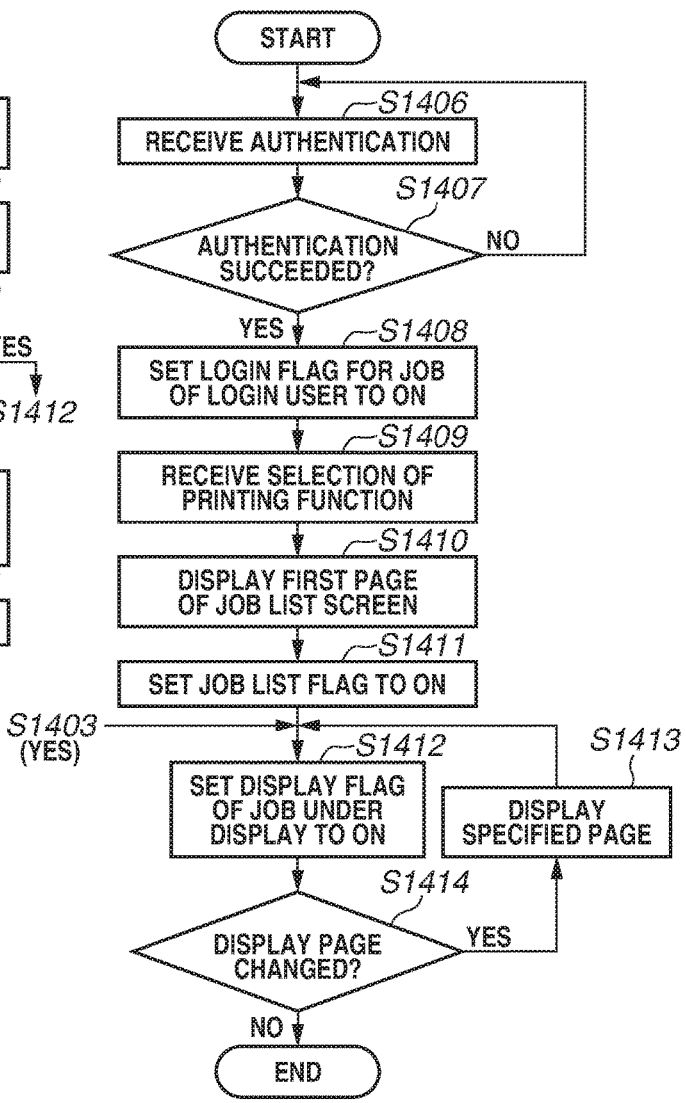

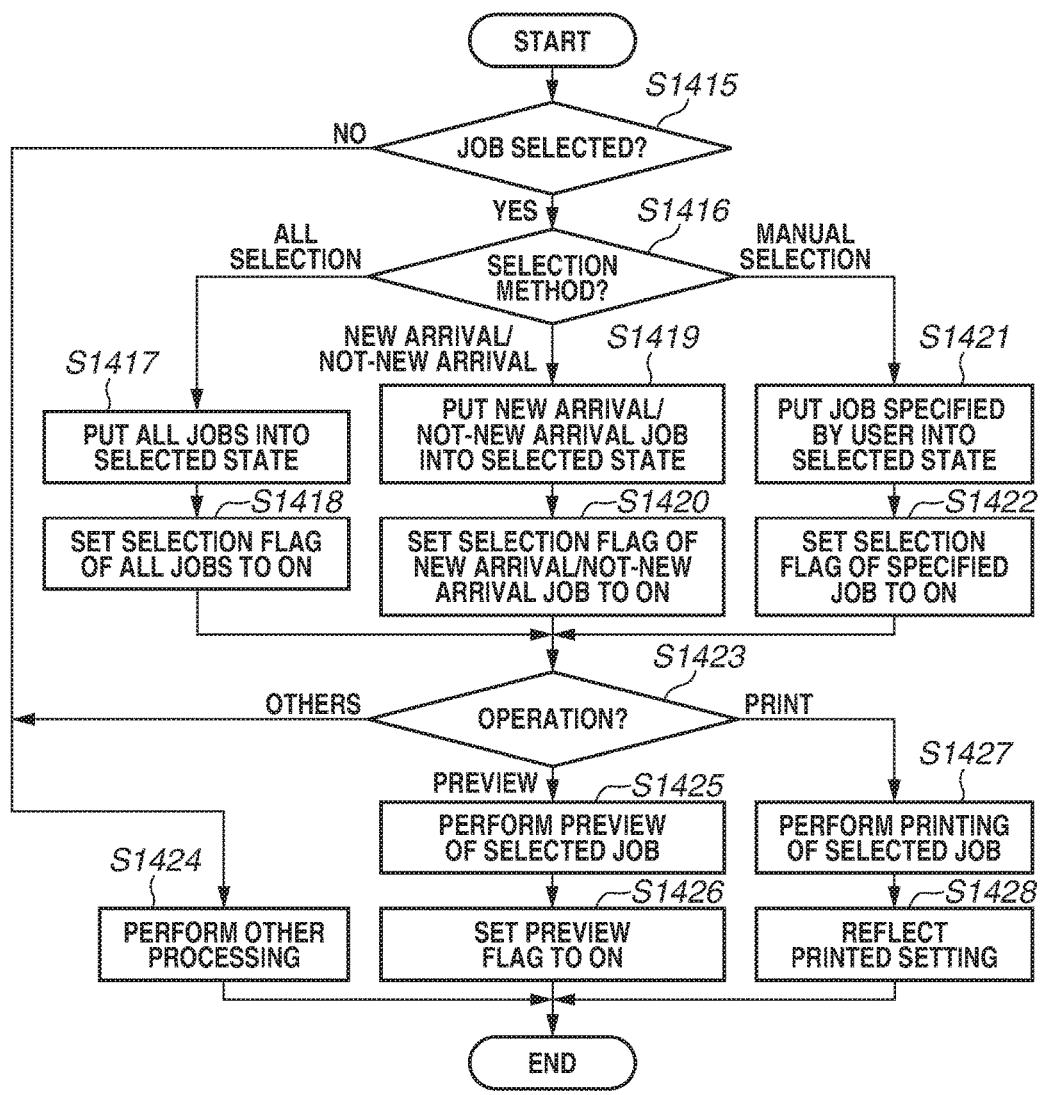

IMAGE FORMING APPARATUS, IMAGE FORMING METHOD, AND STORAGE MEDIUM

BACKGROUND

Field

The present disclosure relates to an image forming apparatus for forming an image on a sheet.

Description of the Related Art

An image forming apparatus, such as a printer, has been well-known as an apparatus for printing an image on a sheet (paper). As an example of such an image forming apparatus, an image forming apparatus that starts printing when a user selects a previously-registered print job to instruct printing has been well-known (see Japanese Patent Application Laid-Open No. 2007-251279). Japanese Patent Application Laid-Open No. 2007-251279 discusses, as a method of selecting print jobs, a method in which the print jobs are manually selected from a print job list by a user one by one, and a method in which the print jobs are collectively selected by "all selection button".

A use case where print jobs are newly registered in a printer in which print jobs are previously registered, and the newly-registered print jobs (hereinafter, referred to as newly-arrived jobs) are printed, is assumed. In a case where the image forming apparatus discussed in Japanese Patent Application Laid-Open No. 2007-251279 is used in the above-described use case, the user selects the newly-arrived jobs through manual selection or selection by the "all selection button". In the case where the newly-arrived jobs are selected manually, finding the newly-arrived jobs from a list of a plurality of print jobs is required. In the case where the newly-arrived jobs are selected by the "all selection button", print jobs other than the newly-arrived jobs are also collectively selected and unnecessarily printed. Alternatively, when the selection can be manually cancelled one by one, a finding out jobs to be deselected from the plurality of all selected print jobs is required.

Under such circumstances, what is needed is an image forming apparatus that provides excellent usability in facilitating selection of newly-arrived jobs.

SUMMARY OF THE INVENTION

The present disclosure is directed to an image forming apparatus excellent in usability for selecting newly-arrived jobs.

According to an aspect of the present disclosure, an image forming apparatus includes a registration unit configured to register a print job in association with a user, a display control unit configured to display a list of print jobs registered in association with a user logged in the image forming apparatus, a print control unit configured to perform printing based on a print job selected from the displayed list, and a storage unit configured to store state information in association with the print job, the state information relating to whether a predetermined operation is performed by the user associated with the print job during a period after the print job is registered until the print job is printed, wherein the display control unit displays, based on the state information stored in association with each print job, a print job subjected to the predetermined operation and a print job not subjected to the predetermined operation.

Further features will become apparent from the following description of exemplary embodiments with reference to the attached drawings.

BRIEF DESCRIPTION OF THE DRAWINGS

FIGS. 1A and 1B are diagrams respectively illustrating a configuration of a printing system and a sequence of the printing system.

FIG. 2 is a block diagram illustrating a hardware configuration of an image forming apparatus.

FIG. 8 is a diagram illustrating a bibliographic information table.

FIG. 10 is a flowchart illustrating print job selection processing.

FIGS. 11A, 11B, 11C, and 11D are diagrams respectively illustrating a job selection screen, manual selection, newly-arrived job selection, and all selection.

FIGS. 12A, 12B, and 12C are diagrams respectively illustrating a screen for setting an object to be released from a new arrival state, an operation setting screen, and a user setting table.

FIG. 13 is a diagram illustrating a job state management table.

FIGS. 14A, 14B, and 14C are flowcharts respectively illustrating a user operation processing, post-authentication list display processing, and job selection reception processing.

DESCRIPTION OF THE EMBODIMENTS

Figure 3:
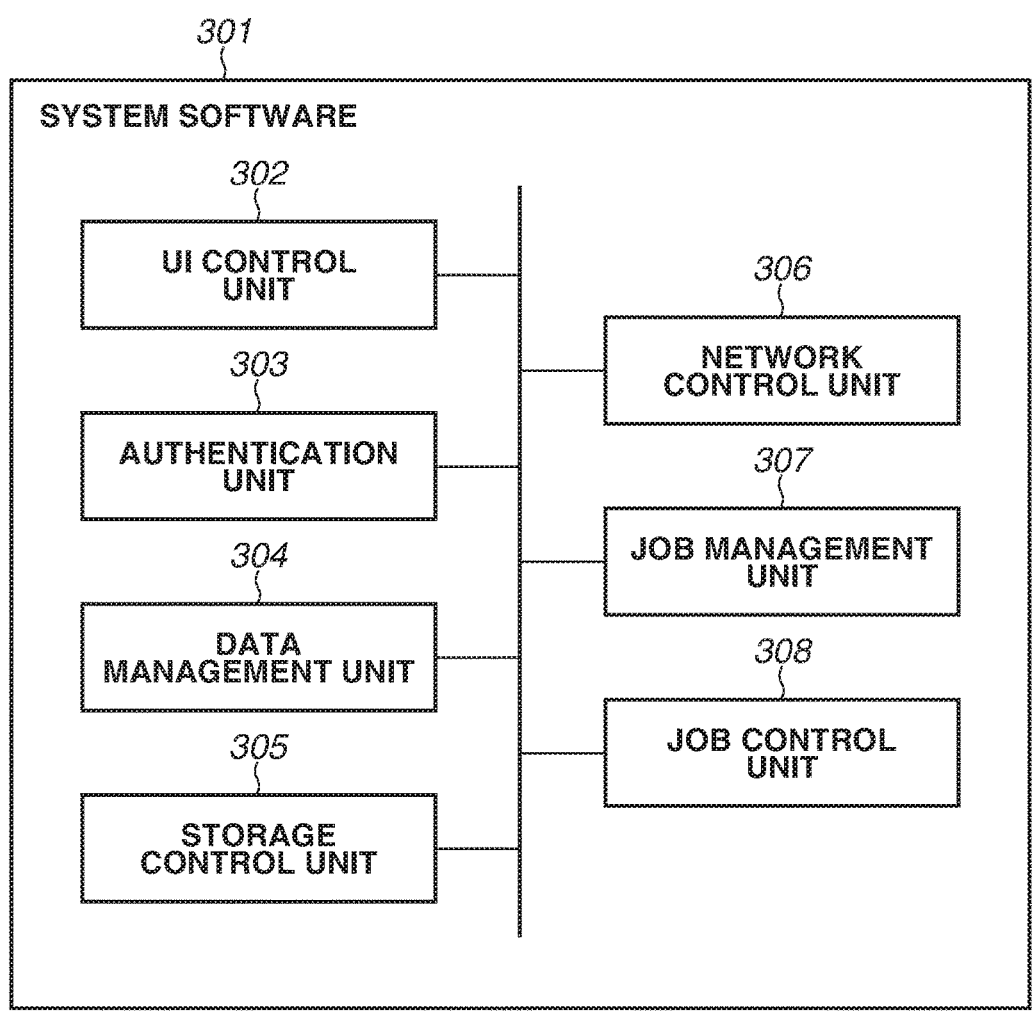
FIG. 3 is a block diagram illustrating a functional configuration of the image forming apparatus.

Exemplary embodiments are described below. Configurations described in the exemplary embodiments are not intended to limit the scope of the disclosure to only the described configurations.

<Printing System 1>

In a first exemplary embodiment, a printing system 1 illustrated in FIG. 1A is described as an example. FIG. 1A is a diagram illustrating a configuration of the printing system 1. The printing system 1 (image forming system) includes a personal computer (PC) 101 and an image forming apparatus 102. The PC 101 and the image forming apparatus 102 are communicably connected to each other through a local area network (LAN) 103. The number of PCs to be connected and the number of image forming apparatuses to be connected are not limited thereto.

The PC 101 is an information processing apparatus capable of processing information. The PC 101 can input print data to the image forming apparatus 102 through the LAN 103.

The image forming apparatus 102 is a printer for forming an image on a sheet (paper). The image forming apparatus 102 manages bibliographic information that is management information (registration information) of the print data and a print job input from the PC 101. The image forming apparatus 102 may be a multifunction printer (MFP) or a single-function printer (SFP). In the present exemplary embodiment, an input source of the print job is the PC 101 but may be a device other than the PC (e.g., mobile terminal or other image forming apparatus).

The LAN 103 is a communication means realizing the communication between apparatuses. The LAN 103 may be replaced with other communication systems that can realize the communication between apparatuses, such as a universal serial bus (USB) communication.

Next, a printing sequence 2 realized by the present exemplary embodiment in the printing system 1 is described. FIG. 1B is a diagram illustrating the printing sequence.

In the printing sequence 2, in step S110, a user first logs in the image forming apparatus 102 and selects a printing function. In step S111, the image forming apparatus 102 displays a job list of the login user. Subsequently, in step S112, the user performs an operation to mark the print job as read (operation to confirm that print job has been registered). In step S113, the image forming apparatus 102 performs processing to mark, as read, the print job that is an object of mark as a read operation by the user. Thereafter, when the user performs a logout operation in step S114, the image forming apparatus 102 performs logout processing in step S115.

Thereafter, in step S116, the user logs in the PC 101 and performs an instruction to input the print job to the image forming apparatus 102. In step S117, the PC 101 generates print data in association with information of the login user, and then, in step S118, transmits the print data to the image forming apparatus 102. In step S119, the image forming apparatus that has received the print data registers the print job in association with an account of the user, based on the print data. At this time, the print job is registered as an unread job (unconfirmed job). Thereafter, in step S120, the user logs in the image forming apparatus 102, and selects the printing function. In step S121, the image forming apparatus 102 displays a job list of the login user. Subsequently, in step S122, the user performs an operation to select an unread job. In steps S123 and S124, the image forming apparatus 102 extracts only unread jobs from the print jobs associated with the user, and collectively puts the extracted unread jobs into a selected state. When the user successively performs the printing instruction in step S125, the image forming apparatus starts printing of the unread jobs in the selected state in step S126.

As described above, in the printing sequence 2, a read state (confirmed state) and the unread state (unconfirmed state) of each of the print jobs are stored. Therefore, when the user wants to collectively print the unread jobs, the user can collectively select the unread jobs. This makes it possible to save a work of the user for selecting the unread jobs one by one. A specific configuration to realize the above-described printing sequence is described below.

<Image Forming Apparatus 102>

FIG. 2 is a block diagram illustrating a hardware configuration of the image forming apparatus 102. As illustrated in FIG. 2, the image forming apparatus 102 includes an operation unit 207, and a controller unit 201. Further, a scanner 210 and a printer 211 are connected to the image forming apparatus 102.

The operation unit 207 is an operation unit that can receive an operation from the user and a display unit that can present information to the user. The operation unit 207 includes, for example, a touch panel and a plurality of hardware keys.

The scanner 210 is a reading unit for reading a document and generating an image.

The printer 211 is an image forming unit that forms an image on a sheet. The printer 211 can perform image formation based on the print data. The printer 211 may be of an electrophotographic system or of an inkjet system.

In the controller unit 201 in the image forming apparatus 102, a central processing unit (CPU) 202 is a computing unit that controls the entire system. A random access memory (RAM) 203 is a system work memory for operation of the CPU 202 and is an image memory that temporarily stores the image data. Programs such as an operating system, system software, and application software, and data are loaded into the RAM 203. A read-only memory (ROM) 204 stores a boot program of the system. A hard disk drive (HDD) 205 stores the operating system, the system software, the application software, image data, setting data, etc. An operation unit interface (I/F) 206 is an interface for the operation unit 207, and provides, to the operation unit 207, information to be displayed on the operation unit 207. Further, the operation unit I/F 206 receives, from the operation unit 207, information input by the user.

A network I/F 208 is connected to the network (LAN) 103, and performs input/output of information with the PC or other image forming apparatuses connected to the same LAN. A device I/F 209 connects the scanner 210 (i.e., image input device) and the printer 211 (i.e., image output device) to the controller unit 201, and performs input and output of the image data. The devices described above are disposed on a system bus 212.

FIG. 3 is a block diagram illustrating a functional configuration of the image forming apparatus. System software 301 is stored in any storage unit out of the RAM 203, the ROM 204, and the HDD 205, and is executed by the CPU 202.

A user interface (UI) control unit 302 receives, through the operation unit I/F 206, the information input by the user through the operation unit 207, and transmits the information to an authentication unit 303, a data management unit 304, and a job management unit 307. Alternatively, the UI control unit 302 receives responses from the authentication unit 303, the data management unit 304, and the job management unit 307, and provides the information to the operation unit 207 through the operation unit I/F 206.

The authentication unit 303 performs authentication processing based on authentication information received from the UI control unit 302 and returns a result of the authentication processing. The function of the authentication unit 303 may be provided to an external server or the like, and the external server or the like may be used as an authentication unit. Further, as the authentication method, biometric authentication such as fingerprint authentication and face authentication, integrated circuit (IC) card authentication, mobile terminal authentication, etc. may be used in addition to authentication using a user name and a password.

The date management unit 304 receives a data writing request or data reading request from the UI control unit 302, a network control unit 306, and the job management unit 307, and transmits the data writing request or data reading request to a storage control unit 305. Alternatively, the date management unit 304 receives a response from the storage control unit 305, and transmits information of the response to the UI control unit 302, the network control unit 306, and the job management unit 307.

The storage control unit 305 receives the data writing request or the data reading request from the data management unit 304, performs writing or reading of data on the HDD 205, and returns a result of the writing or the reading to the data management unit 304.

The network control unit 306 receives, through the network I/F 208, a request from the PC 101 or an optional image forming apparatus that is connected to the LAN 103. The network control unit 306 further requests processing to the data management unit 304 and the job management unit 307 according to the received request. Alternatively, the network control unit 306 receives a response from the data management unit 304 and the job management unit 307. The network control unit 306 then transmits, through the network I/F 208, the received response to the PC 101 or the optional image forming apparatus that is connected to the LAN 103.

The job management unit 307 receives a job execution request from the UI control unit 302 or the network control unit 306, and manages a job. Further, the job management unit 307 requests a job control unit 308 to execute the job, or transmits the data writing request or the data reading request to the data management unit 304. Alternatively, the job management unit 307 receives a response from the data management unit 304 or the job control unit 308, and transmits a state of the job to the UI control unit 302 or the network control unit 306.

The job control unit 308 receives the job execution request from the job management unit 307, and controls operation of the scanner 210 and the printer 211 through the device I/F 209. Alternatively, the job control unit 308 receives the operation state of each of the scanner 210 and the printer 211 through the device I/F 209, and transmits the operation state to the job management unit 307.

<PC 101>

Figure 4:
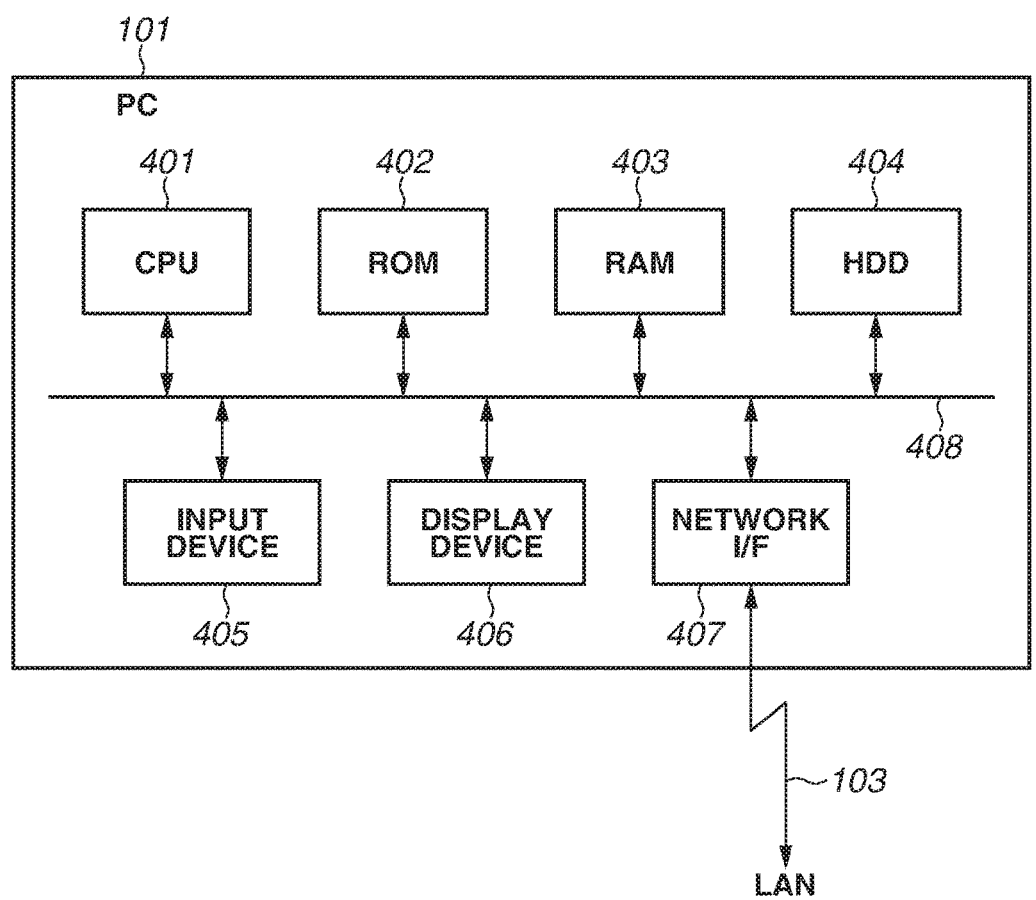
FIG. 4 is a block diagram illustrating a hardware configuration of a personal computer (PC).

FIG. 4 is a block diagram illustrating a hardware configuration of the PC 101. In the PC 101, a CPU 401 is a computing unit that controls the entire system. A ROM 402 stores programs and data related to processing. A RAM 403 is a system work memory for operation of the CPU 401, and is a storage memory that stores temporary data related to each processing. A HDD 404 stores the programs, data, temporary data, application data, and the like related to the processing. An input device 405 is a keyboard and a pointing device that receive instruction input to the apparatus. A display device 406 displays the operation state of the apparatus and information output from each of the programs that are operated on the apparatus. A network I/F 407 is connected to the network (LAN) 103, and performs input/output of the information with other PCs and the image forming apparatuses connected to the same LAN. The elements described above are disposed on a system bus 408.

The CPU 401 executes the processing based on the programs that correspond to the operating system (OS), a printer driver, and applications stored in the HDD 404. As a result, the functions (or processing) by the OS and the printer driver are realized.

Figure 5:
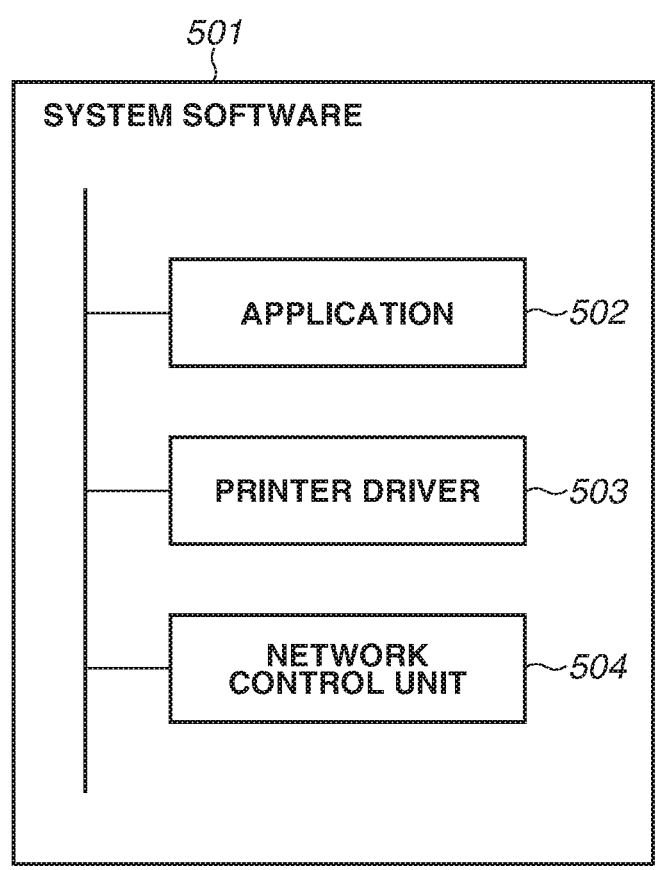
FIG. 5 is a block diagram illustrating a functional configuration of the PC.

FIG. 5 is a block diagram illustrating a functional configuration of the PC. A system software 501 is stored in any storage unit out of the ROM 402, the RAM 403, and the HDD 404, and is executed by the CPU 401.

The system software 501 includes an application 502, a printer driver 503, and a network control unit 504. For example, the application 502 is a tool through which the user creates and edits an image and a document with use of the input device 405 such as a pointing device and a keyboard while viewing the display device 406 of the PC 101. Alternatively, the application 502 is a tool allowing the user to refer to the information in the image forming apparatus. The user creates data of an image, a document, and the like, with use of the application 502, creates print command data with use of the printer driver 503, and transmits the data to an apparatus that can perform printing, such as the image forming apparatus 102, through the network control unit 504. Alternatively, the user acquires and refers to the information from the image forming apparatus 102 through the network control unit 504.

<Print Data Transmission Processing>

Figure 6:
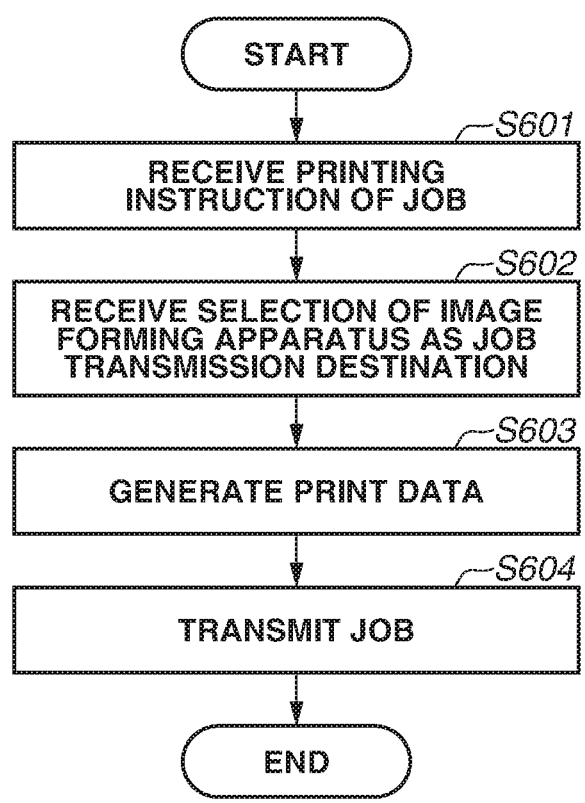
FIG. 6 is a flowchart illustrating input processing of a print job.

FIG. 6 is a flowchart illustrating input processing of the print job. The program based on the flowchart is executed by the CPU 401 of the PC 101. The input processing is used in steps S117 and S118 of the printing sequence 2.

The user creates data of an image, a document, and the like with the application 502 by using the input device 405 such as a pointing device and a keyboard while viewing the display device 406, and then instructs printing of the data. When receiving the printing instruction in step S601, the application 502 displays, on the display device 406, a screen (not illustrated) that allows the user to select the image forming apparatus as a transmission destination of the print job. When receiving selection, by the user, of the image forming apparatus as the transmission destination of the print job in step S602, the application 502 makes a data generation request to the printer driver 503 that corresponds to the selected image forming apparatus.

In step S603, the printer driver 503 creates page description language (PDL) data according to the data of the image, the document, and the like, a document attribute such as a document name, and print setting information that is set in the printer driver when the printing is instructed. In step S604, the printer driver 503 transmits the print data to register the print job to the image forming apparatus 102.

<Print Job Registration Processing>

Figure 7:
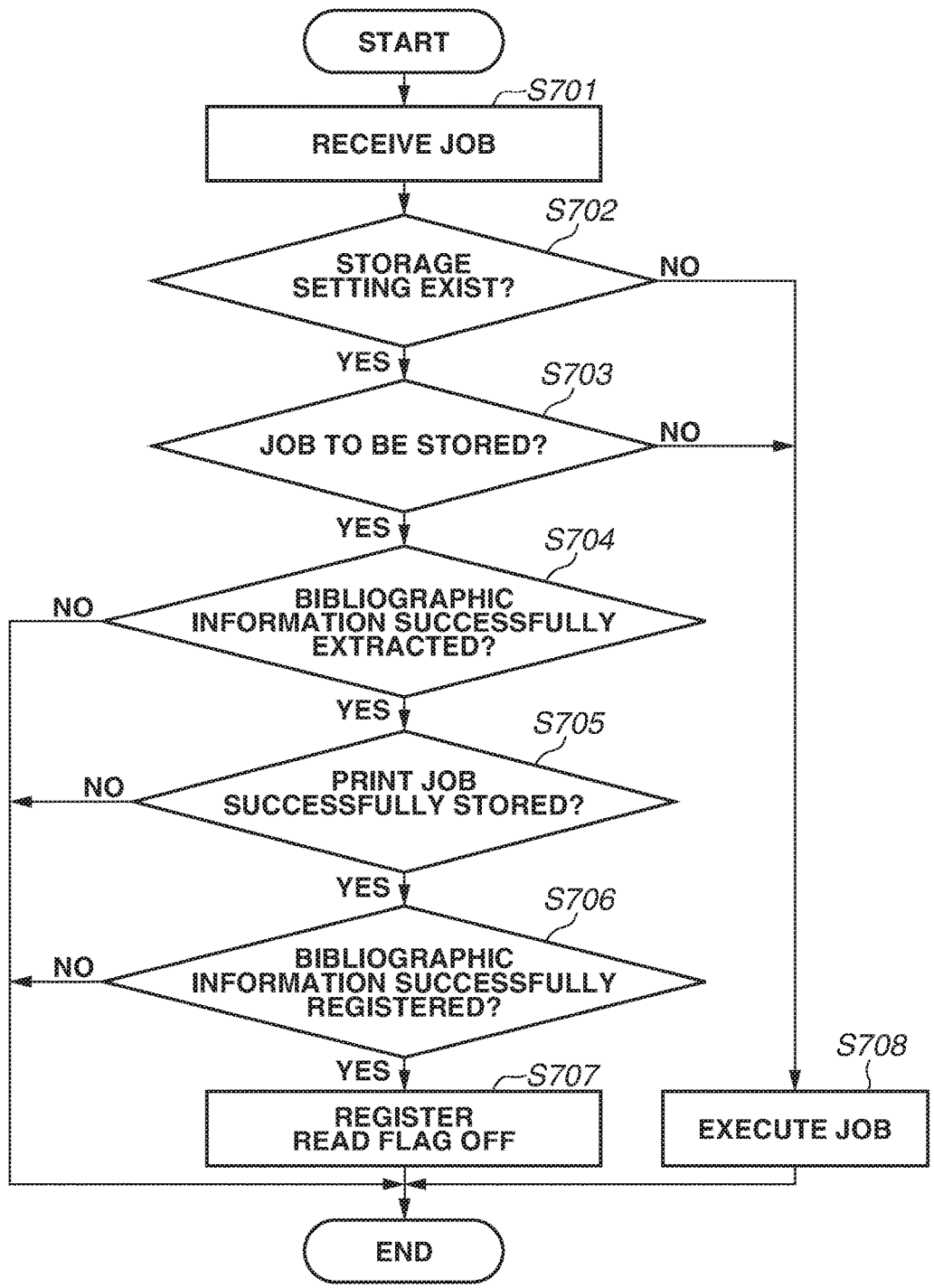
FIG. 7 is a flowchart illustrating print job registration processing.

FIG. 7 is a flowchart illustrating print job registration processing. The program based on the flowchart is executed by the CPU 202 of the image forming apparatus 102. The registration processing is used in step S119 of the printing sequence 2.

In step S701, when receiving the print data from the PC 101, the network control unit 306 transmits the print data to the job management unit 307 to handle the print data as a print job. In step S702, when receiving the print data, the job management unit 307 determines whether a storage setting (registration setting) exists in the image forming apparatus 102. The storage setting of the print job is set for each image forming apparatus, and the storage control unit 305 stores the storage setting of the print job in the HDD 205, the RAM 203, or the like. In a case where the storage setting of the print job does not exist (NO in step S702), the processing proceeds to step S708. In step S708, the job management unit 307 makes an execution request of the print job to the job control unit 308, and executes printing. In a case where the storage setting of the print job exists (YES in step S702), the processing proceeds to step S703. In step S703, the job management unit 307 analyzes the print job and determines whether the print job is a job to be stored. The print job is determined as the job to be stored in a case where information provided to the print job, such as a name of the print job, a user name of the print job, and identification information of a PC executing the print job is coincident with a predetermined condition.

Alternatively, in a case where the information provided to the print job is not coincident with the condition, the print job may be determined as the job to be stored. In a case where the print job is not a job to be stored (NO in step S703), the processing proceeds to step S708. In step S708, the job management unit 307 makes an execution request of the print job to the job control unit 308, and printing is performed. In a case where the print job is a job to be stored (YES in step S703), the processing proceeds to step S704. In this case, the job management unit 307 transmits the print job to the data management unit 304. The data management unit 304 analyzes the print job received from the job management unit 307, and extracts bibliographic information. In a case where the data management unit 304 can successfully extract the bibliographic information (YES in step S704), the processing proceeds to step S704. In this case, the data management unit 304 transmits the print job and the extracted bibliographic information to the storage control unit 305. The storage control unit 305 stores the received print job in the HDD. In addition, the storage control unit 305 stores, in the HDD 205, the extracted bibliographic information in association with the user. In a case where the print job is successfully stored and the bibliographic information is successfully registered (YES in steps S705 and S706), the processing proceeds to step S707. In step S707, the job management unit 307 sets the read flag to OFF.

FIG. 8 is a diagram illustrating an example of a bibliographic information table. A bibliographic information table 801 is a bibliographic information table for managing jobs related to a user (User A). The bibliographic information table 801 includes a field 802 of date at which the print job has been input, a field 803 of an IP address of the image forming apparatus to which the print job has been input, a field 804 of a storage location of the input print job, a field 805 of the print job name, a print setting field 806, and a read flag field 807. In a case where the process has failed due to, for example, shortage of a free space of the HDD 205 in any of the processes in steps S704, S705, and S706 (NO in step S704, S705, or S706), the process ends. In a case where the bibliographic information has been successfully registered, the read flag (confirmation information) is registered as OFF, and the processing ends. The print job registration processing is performed in this way.

<User Operation Reception Processing>

Figure 9:
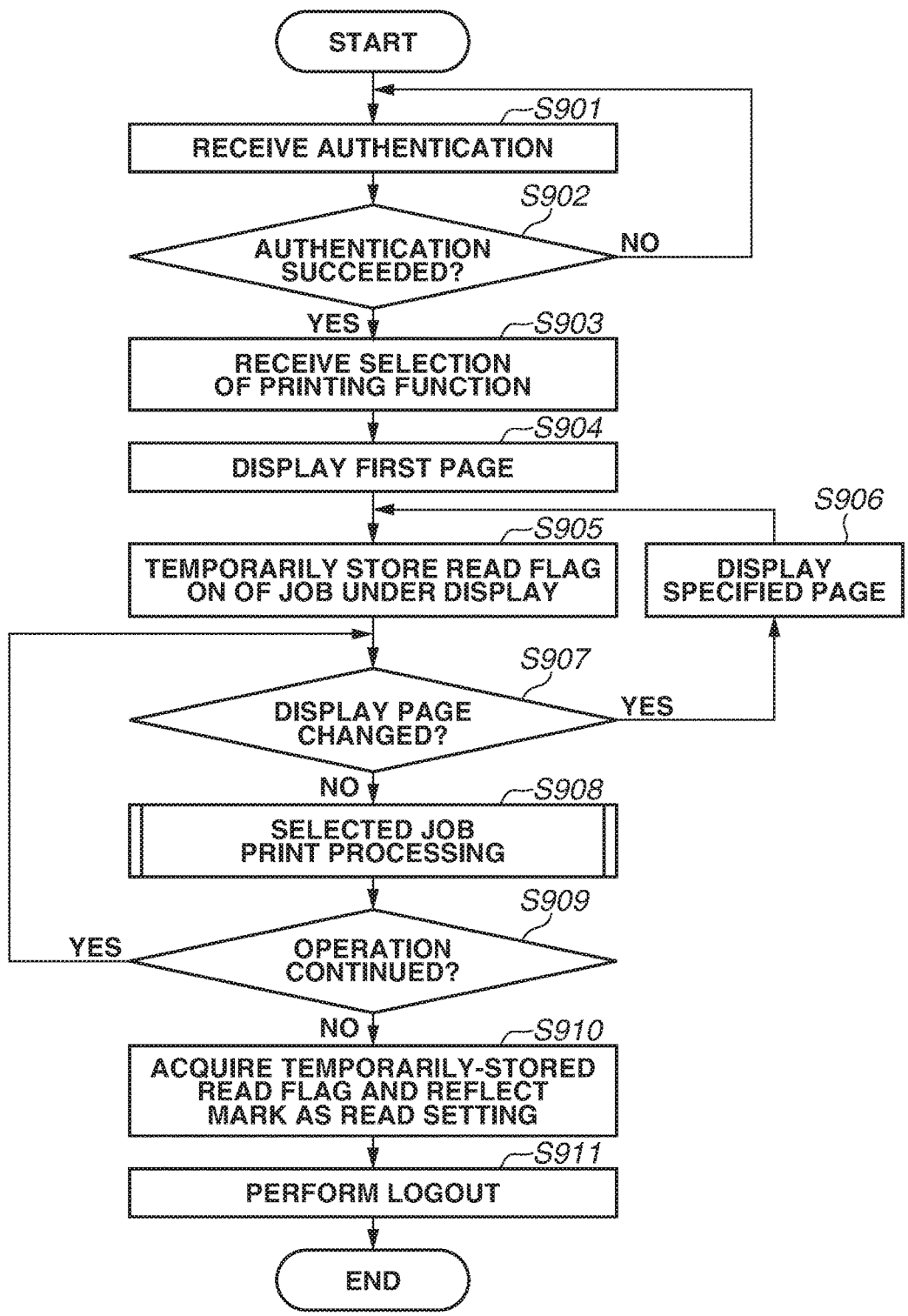
FIG. 9 is a flowchart illustrating user operation reception processing.

FIG. 9 is a flowchart illustrating user operation reception processing. The program based on the flowchart is executed by the CPU 202 of the image forming apparatus 102. The user operation reception processing is used in steps S111, S113, S115, S121, S123, S124, and S126 of the printing sequence 2.

In the user operation reception processing, in step S901, the authentication unit 303 receives login information input by the user through the operation unit 207. Then, in step S902, the authentication unit 303 performs authentication processing based on the login information. In a case where the authentication processing has failed (NO in step S902), the processing proceeds to step S901. In a case where the authentication processing has succeeded (YES in step S902), the processing proceeds to step S903. In step S903, after the user authentication, the CPU 202 receives selection of the printing function by the user. The printing function may be configured to be automatically selected after the user authentication. When the printing function is selected, the data management unit 304 acquires the bibliographic information list of the login user from the HDD 205 through the storage control unit 305. Then, the data management unit 304 transmits the acquired bibliographic information list to the UI control unit 302. In step S904, the UI control unit 302 displays a job selection screen as illustrated in FIG. 11A on the operation unit 207 based on the received bibliographic information list. In a case where the print jobs includes a plurality of pages, a first page is displayed first. At this time, in step S905, the job management unit 307 temporarily stores the read flag of the job under display as ON, i.e., performs storage processing. Thereafter, when the user instructs change of the display page (YES in step S907), the CPU 202 performs processing to display a specified page. When the user performs an operation to print the selected jobs (NO in step S907), the processing proceeds to step S908. In step S908, the CPU 202 executes the selected job print processing. The details of the selected job print processing are described below. In a case where an operation continuation instruction is given by the user after the selected job print processing is executed (YES in step S909), the processing proceeds to step S907. In a case where an operation termination instruction is given by the user after the selected job print processing is executed (NO in step S909), the processing proceeds to step S910. Thereafter, in step S910, the CPU 202 updates the read state information of each of the jobs based on the read flag ON stored during login. After the read state is updated, the CPU 202 performs logout processing.

Next, the selected job print processing is described in detail. FIG. 10 is a flowchart illustrating the selected job print processing. The program based on the flowchart is executed by the CPU 202 of the image forming apparatus 102. The selected job print processing is used in step S908 of the user operation reception processing. FIG. 11A is a diagram illustrating the print job selection screen. FIG. 11B is a diagram illustrating manual job selection. FIG. 11C is a diagram illustrating unread job selection. FIG. 11D is a diagram illustrating all job selection.

In a case where the selected job print processing is executed, the print job selection screen (FIG. 11A) is displayed on the operation unit 207. The print job selection screen includes, as selection objects, a job list 1101, an all select button 1102, a newly-arrived job select button 1103, a print button 1104, a delete button 1105, a setting change button 1106, a preview button 1107, and a new arrival notification icon 1111 (new arrival icon). In a state where no job is selected, the print job button 1104, the delete button 1105, the setting change button 1106, and the preview button 1107 are unselectable. In a state where one job is selected, the print button 1104, the delete button 1105, the setting change button 1106, and the preview button 1107 are selectable. In a state where a plurality of jobs are selected, the print button 1104 and the delete button 1105 are selectable, and the setting change button 1106 and the preview button 1107 are unselectable. The unselectable object may not be displayed.

The job list 1101 is a selection object in which information of the print jobs associated with the login user is listed. The user touches an optional job in the job list 1101 to put the optional job into a selected state as illustrated in FIG. 11B.

The all select button 1102 is a selection object to select jobs.

The newly-arrived job select button 1103 is a selection object to select jobs.

The print button 1104 is a selection object to start printing. When the print button 1104 is selected in a state where any job is selected, printing of the job in the selected state is started.

The delete button 1105 is a selection object to delete a print job. When the delete button 1105 is selected in the state where a job is selected, the job in the selected state is deleted (hidden) from the job list 1101.

The setting change button 1106 is a selection object to call up a setting change screen (not illustrated). When the setting change button 1106 is selected in the state where a job is selected, the print setting of the job in the selected state is changed on the setting change screen. The changeable print setting includes color/monochrome, double-sided/single-sided, and the number of copies.

The preview button 1107 is a selection object to call up a preview screen (not illustrated). When the preview button 1107 is selected in the state where a job is selected, a preview image of the job in the selected state can be confirmed on the preview screen.

The new arrival notification icon 1111 is a notification object to notify the user of a newly-arrived job (unread job). When the print job selection screen is displayed, the CPU 202 provides the new arrival notification icon 1111 to the job in the unread state in the job list 1101. For this reason, the CPU 202 determines the job in the unread state based on the bibliographic information table 801. At this time, according to the bibliographic information table 801, the jobs in the unread state (read flag is OFF) are jobs "CCC.doc" and "DDD.pptx". Therefore, the CPU 202 provides the new arrival notification icon 1111 to each of the jobs "CCC.doc" and "DDD.pptx". By providing the icon to the newly-arrived job in this way, the user can easily find the newly-arrived job. The display method may not be the icon as long as the display method allows discrimination of the newly-arrived job and not-newly-arrived job. For example, the discrimination may be achieved by illustrating the document name of the newly-arrived job with bold characters. Alternatively, the discrimination may be achieved by coloring a selection region of the newly-arrived job.

In step S1001, the CPU 202 receives the selection operation by the user in the state where the above-described screen is displayed. In step S1002, the CPU 202 determines an operation content of the user.

In a case where the operation content of the user is selection of the all select button 1102 (all selection in step S1002), the processing proceeds to step S1003. In step S1003, the CPU 202 puts all of the jobs in the job list 1101 into the selected state. Then, the CPU 202 displays a state icon 1110 as illustrated in FIG. 11D.

In a case where the operation content of the user is selection of the newly-arrived job select button 1103 (unread selection in step S1002), the processing proceeds to step S1004. In step S1004, the CPU 202 performs processing to put the jobs in the unread state in the job list 1101 into the selected state. For this reason, the CPU 202 determines the jobs in the unread state based on the bibliographic information table 801. At this time, according to the bibliographic information table 801, the jobs in the unread state (read flag is OFF) are the jobs "CCC.doc" and "DDD.pptx". Accordingly, the CPU 202 displays a state icon 1109 as illustrated in FIG. 11C.

In a case where the operation content of the user is selection of an optional job (manual selection in step S1002), the processing proceeds to step S1005. In step S1005, the CPU 202 puts the selected job into the selected state. Here, a case where the job "CCC.doc" is selected is described as an example. The CPU 202 then displays a state icon 1108 as illustrated in FIG. 11B (performs display control processing). At this time, if the job in the selected state is selected, the job is deselected. In this way, the display state is controlled so as to be different between the job in the selected state and the job in the unselected state.

In step S1006, the CPU 202 receives the selection of the print button 1104 (printing instruction) in the state where any job is selected. In step S1007, the CPU 202 acquires the print data of the selected print job. In a case where the plurality of print jobs has been selected, the CPU 202 acquires the print data in order of a number indicated by the selection icon. In step S1008, the CPU 202 causes the printer 211 to execute image formation (printing) based on the acquired print data. Thereafter, in a case where there is an unprinted selected job (NO in step S1009), the processing proceeds to step S1007. In step S1007, the CPU acquires the print data of the next job. In a case where all of the selected jobs have been printed (YES in step S1009), the processing ends.

As described above, according to the present exemplary embodiment, it is possible to collectively select the jobs in the unread state. In other words, in particular, it is possible to collectively select only the print jobs before the marking as a read operation is performed by the user, out of the jobs before the printing is performed. This makes it possible to reduce labor of the user operation to select the jobs one by one when the user instructs printing of the newly-arrived jobs, and the present exemplary embodiment is accordingly excellent in usability. Further, unlike all selection, it is unnecessary to deselect the jobs in the read state. This makes it possible to reduce labor for deselecting the read jobs (confirmed jobs).

Further, the read state is updated at a timing of logout (at a time of logout) in the present exemplary embodiment. However, the read state may be updated at other timings. For example, the read state may be updated at a timing of login or at a timing immediately after reading. To prevent occurrence of an issue that "read state is changed and the operation method is accordingly changed during login", it is desirable to update the read state at the timing of logout. This prevents the user from being confused.

Next, a second exemplary embodiment is described. In the first exemplary embodiment, the job not displayed on the screen (unread job) is used as the example of the job handled as the newly-arrived job. On the other hand, in the second exemplary embodiment, a job other than the unread job can be also handled as the newly-arrived job. More specifically, a job immediately after being input to the printer is managed in a new arrival state, and the new arrival state is released according to satisfaction of a predetermined condition. The releasing condition of the new arrival state may be selected from a plurality of items and set. In other words, it is possible for the user to previously set a job as an object of the newly-arrived job.

In the first exemplary embodiment, the newly-arrived job select button is used to select the newly-arrived job. On the other hand, the second exemplary embodiment provides a selection method other than the newly-arrived job select button. In the second exemplary embodiment, it is possible to manage various kinds of settings for each user. A configuration of a printing system according to the second exemplary embodiment is similar to that of the first exemplary embodiment except for a configuration relating to the above-described change. Accordingly, the same components are denoted by the same reference numerals and detailed description thereof is omitted.

<Setting of Object to be Released from New Arrival State>

FIG. 12A is a diagram illustrating a screen for setting an object to be released from the new arrival state. As illustrated in FIG. 12A, in the present exemplary embodiment, a condition of an object to be released from the new arrival state is selected from a plurality of conditions and set.

As conditions for the object to be released from the new arrival state, "release object from new arrival state by login", "release object from new arrival state by job list screen" (release object from new arrival state by execution of printing function), "release object from new arrival state by display of job", "release object from new arrival state by selection of job", and "release object from new arrival state by preview of job" are displayed in a selectable state in a screen 1200 for setting the object to be released from the new arrival state. When a set button is selected after a condition is selected on the setting screen 1200, the setting is reflected. When a cancel button is selected, the setting is not reflected.

In a case where "release object from new arrival state by login" is set as the condition for releasing the new arrival state, the jobs already input by the user are all released from the new arrival state in response to the user login.

In a case where "release object from new arrival state by job list screen" is set as the condition for releasing the new arrival state, the jobs already input by the user are all released from the new arrival state in response to the user selection of the printing function to display the job selection screen.

In a case where "release object from new arrival state by display of job" is set as the condition for releasing the new arrival state, the jobs already input by the user are released from the new arrival state in response to display of the jobs on the screen. More specifically, in a case where only a first page is displayed out of two pages in the job list, jobs included in the first page are handled as objects to be released from the new arrival state. However, jobs included in a second page are not handled as objects to be released from the new arrival state.

In a case where "release object from new arrival state by selection of job" is set as the condition for releasing the new arrival state, the jobs already input by the user are released from the new arrival state in response to the selection operation by the user to put the jobs into the selected state.

In a case where "release object from new arrival state by preview of job" is set as the condition for releasing the new arrival state, the jobs already input by the user are released from the new arrival stage in response to the display of the preview screen of each of the jobs according to the preview instruction by the user.

Further, the new arrival state may be released based on a condition not illustrated in FIG. 12A. For example, the new arrival state may be released with other operations by the user, such as change of the print setting, as a trigger. The above-described condition for releasing the new arrival state may be singularly set or may be set in combination.
<Operation Setting of New Arrival/Not-New Arrival>

FIG. 12B is a diagram illustrating an operation setting. As illustrated in a screen 1210 for setting the selection operation, in the present exemplary embodiment, a function to be used can be selected from a plurality of functions each using the state information that indicates not-new arrival/new arrival.

The plurality of functions each using the state information that indicates not-new arrival/new arrival are selectably displayed on the setting screen 1210. The functions include "display newly-arrived job selection icon", "display not-newly-arrived job selection icon", "automatically select newly-arrived job", "automatically select not-newly-arrived job", and "automatically print newly-arrived job by login". When the set button is selected after a condition is selected in the setting screen 1210, the setting is reflected. When the cancel button is selected, the setting is not reflected.

When "display newly-arrived job selection icon" is set, a newly-arrived job selection button 1103 is displayed on the job selection screen. This is useful for, for example, a case of printing only a new-arrived job without printing a not-newly-arrived job.

When "display not-newly-arrived job selection icon" is set, a not-newly-arrived job selection button (not illustrated) is displayed on the job selection screen. This is useful for, for example, a case of deleting only not-newly-arrived job without deleting a newly-arrived job.

When "automatically select newly-arrived job" is set, the newly-arrived job is displayed in the selected state at a time when the job selection screen is displayed. Therefore, it is possible for the user to start printing of the newly-arrived job only by selecting the print button 1104 for issuing printing instruction.

When "automatically select not-newly-arrived job" is set, the not-newly-arrived job is displayed in the selected state at a time when the job selection screen is displayed. Therefore, it is possible for the user to start deletion of the not-newly-arrived job only by selecting the delete button 1105 for issuing a deletion instruction.

When "automatically print newly-arrived job by login" is set, printing of the newly-arrived job of the login user is automatically started at a time when the user logs in (at a time when the operation user of image forming apparatus 102 is identified). It is possible for the user to start printing of the newly-arrived job only by logging in the image forming apparatus 102. This is excellent in operability.

The above-described operation setting may be singularly set or may be set in combination.
<User Setting Management>

FIG. 12C is a diagram illustrating a user setting table. In the present exemplary embodiment, as illustrated in a user setting table 1220, various kinds of setting information are managed in association with account information of users who can log in the image forming apparatus 102. This makes it possible to achieve operability matched with a use mode of the user. According to the user setting table 1220, a job of the user A is released from the new arrival state by preview, and a newly-arrived job of the user A is automatically selected in the job selection screen. On the other hand, a job of the user B is released from the new arrival state by being displayed, and a newly-arrived job selection button 1103 is displayed on the job selection screen of the user B.

In the present exemplary embodiment, the setting information is managed for each user. However, the setting information may be managed in common with all users. However, in terms of customization for each user and improvement of operability, it is desirable to manage the setting information for each user.
<Job State Management Table>

FIG. 13 is a diagram illustrating a job state management table. In the present exemplary embodiment, the image forming apparatus 102 includes a job state management table 1300 in order to manage new arrival based on the setting of an object to be released from the new arrival state. The job state management table 1300 includes a JOB ID field 1301, a job name field 1302, a user name field 1303, a login field 1304, a function execution field 1305, a job display field 1306, a job selection field 1307, a preview field 1308, a printing state field 1309, and a new arrival state release field 1310.

The JOB ID field 1301 is a field for a serial number (identification information) to manage the print jobs registered in the image forming apparatus 102. The job name field 1302 is a field in which a document name of the print job is stored. The user name field 1303 is a field in which a name of a user (job owner) who has input the print job, is stored.

The login field 1304 is a field in which a flag, indicating whether the job owner logs in the image forming apparatus 102 after job registration, is stored. The function execution field 1305 is a field in which a flag, indicating whether the job owner has executed the printing function (displayed job list) after the job registration, is stored. The job display field 1306 is a field in which a flag, indicating whether the information of the job has been displayed on the job selection screen after the job registration, is stored. The job selection field 1307 is a field in which a flag, indicating whether the job has been put into the selected state after the job registration, is stored.

The preview field 1308 is a field in which a flag, indicating whether the job has been previewed after the job registration, is stored. In this case, a state where the login has been performed, a state where the printing function has been executed, a state where the job has been displayed, a state where the job has been put into the selected state, and a state where the job has been previewed are all denoted by "ON", and otherwise, a state is denoted by "OFF". The print job immediately after registration is in "OFF" state in all of the operation flags (confirmation information).

The printing state field 1309 is a field in which a flag, indicating whether the job has been executed and printed after the job registration, is stored. In this example, a case where the job has been printed is denoted by "done", and a case where the job has not been printed is denoted by "not yet". The new arrival state release field 1310 is a field in which a flag, indicating whether the job has been released from the new arrival state after the job registration, is stored. In this case, a state where the job has been released from the new arrival state is denoted by "done", and the new arrival state is denoted by "not yet". The job registration is performed in a substantially similar manner to the first exemplary embodiment. The present exemplary embodiment is different from the first exemplary embodiment in that "read flag OFF" is not registered but "new arrival state release flag (not yet)" is registered in step S707. The "new arrival state release flag (not yet)" indicates that the job is in the new arrival state.

<User Operation Reception Processing>

FIG. 14A is a flowchart illustrating user operation reception processing. The program based on the flowchart is executed by the CPU 202 of the image forming apparatus 102. The user operation reception processing is used in steps S111, S113, S115, S121, S123, S124, and S126 of the printing sequence 2.

In the user operation reception processing, in step S1401, the CPU 202 executes post-authentication list display processing.

Thereafter, in step S1402, the CPU 202 executes job selection reception processing. Further, in step S1403, the CPU 202 determines continuation of the operation.

When it is determined that the operation is continued (YES in step S1403), the processing proceeds to step S1412. When it is determined that the operation is not continued (NO in step S1403), the processing proceeds to step S1404. In step S1404, the CPU 202 updates the new arrival state release flag (new arrival state release field 1310) based on the operation flag and the user setting. After the new arrival state release flag is updated, the CPU 202 executes logout processing of the login user in step S1405, and ends the processing.

Next, the post-authentication list display processing is described in detail. FIG. 14B is a flowchart illustrating the post-authentication list display processing. The program based on the flowchart is executed by the CPU 202 of the image forming apparatus 102. The post-authentication list display processing is used in step S1401 of the user operation reception processing.

In the post-authentication list display processing, in step S1406, the authentication unit 303 receives the login information input by the user through the operation unit 207. In step S1407, the authentication unit 303 performs authentication processing based on the login information. In a case where the authentication processing has failed (NO in step S1407), the processing proceeds to step S1406. In a case where the authentication processing has succeeded (YES in step S1407), the processing proceeds to step S1408. In step S1408, the CPU 202 updates the login flag (login field 1304) of the print job of the login user to ON. After the user authentication, the CPU 202 receives selection of the printing function by the user in step S1409. The printing function may be automatically selected after the user authentication. When the printing function is selected, the data management unit 304 acquires the bibliographic information list of the login user from the HDD 205 through the storage control unit 305. Then, the data management unit 304 transmits the acquired bibliographic information list to the UI control unit 302. In step S1410, the UI control unit 302 displays the job selection screen as illustrated in FIG. 11A on the operation unit 207 based on the received bibliographic information list. In the case where the print job includes a plurality of pages, a first page is displayed. Then, in step S1411, the CPU 202 updates the function execution flag (function execution field 1305) of the print job of the login user to ON. Further, in step S1412, the CPU 202 updates the display flag (job display field 1306) of the job selected on the job selection screen to ON. Then, when change of the display page is instructed by the user (YES in step S1414), the processing proceeds to step S1413. In step S1413, the CPU 202 performs the processing to display the specified page. When the operation to print the selected job is performed by the user (NO in step S1414), the processing proceeds to step S1402. In step S1402, the CPU 202 executes the job selection reception processing.

Next, the job selection reception processing is described in detail. FIG. 14C is a flowchart illustrating the job selection reception processing. The program based on the flowchart is executed by the CPU 202 of the image forming apparatus 102. The job selection reception processing is used in step S1402 of the user operation reception processing.

In the case where the job selection reception processing is executed, the print job selection screen is displayed on the operation unit 207. The CPU 202 receives an operation by the user in the state where the above-described screen is displayed. In step S1415, the CPU 202 determines the operation content of the user. In a case where the operation content of the user is job selection (YES in step S1415), the processing proceeds to step S1416. In a case where the operation content of the user is not job selection (NO in step S1415), the processing proceeds to step S1424. In step S1424, the CPU 202 executes other processing and ends the processing. In step S1416, the CPU 202 determines the job selection method. In a case where the operation content of the user is all job selection, the processing proceeds to step S1417. In step S1417, the CPU 202 puts all of the jobs in the job list 1101 into the selected state. Further, in step S1418, the CPU 202 sets the operation flags (job selection field 1307) of all of the jobs of the login user to ON.

In a case where "display not-newly-arrived job selection icon" is set or in a case where "automatically select not-newly-arrived job" is set, the user can select the not-newlyarrived job. In step S1419, the CPU 202 performs processing to put the job to be released from the new arrival state in the job list 1101, into the selected state. In step S1420, the CPU 202 sets the operation flag (job selection field 1307) of the selected not-newly-arrived job to ON. In a case where "display newly-arrived job selection icon" is set or in a case where "automatically select newly-arrived job" is set, the user can select the newly-arrived job. In step S1420, the CPU 202 sets the operation flag (job selection field 1307) of the selected newly-arrived job to ON.

In a case where the operation content of the user is selection of an optional job, the processing proceeds to step S1421. In step S1421, the CPU 202 puts the selected job into the selected state. In step S1422, the CPU 202 sets the operation flag (job selection field 1307) of the selected job to ON.

In step S1423, the CPU 202 receives the operation instruction of the job and determines the operation instruction content in the state where the job is selected. In a case where the operation content is "other processing" (other processing in step S1423), the processing proceeds to step S1424. In step S1424, the CPU 202 executes the other processing and ends the processing. In a case where the operation content is "preview" (preview in step S1423), the processing proceeds to step S1425. In step S1425, the CPU 202 executes the preview processing of the selected job. Then, in step S1426, the CPU 202 sets the operation flag (preview field 1308) of the previewed job to ON. In a case where the operation content is "print" (print in step S1423), the processing proceeds to step S1427. In step S1427, the CPU 202 executes the print processing of the selected job. Then, in step S1428, the CPU 202 updates the print state (print state field 1309) to "done".

As described above, according to the present exemplary embodiment, it is possible to collectively select the jobs in the new arrival state. This makes it possible to reduce labor of the user operation to select the jobs one by one, and the present exemplary embodiment is accordingly excellent in usability. Further, unlike all selection, it is unnecessary to select the job to be released from the new arrival state. This makes it possible to reduce labor for deselecting the not-newly-arrived job.

In the present exemplary embodiment, it is possible to select and set the condition of the object to be released from the new arrival state from the plurality of conditions. This allows flexible approach in various use environments. Further, the present exemplary embodiment is excellent in usability because the setting is manageable for each user.

In the present exemplary embodiment, it is possible to use the plurality of functions based on the new arrival state release information. Therefore, the present exemplary embodiment is excellent in operability. Further, the present exemplary embodiment is excellent in usability because the setting is manageable for each user.

Other Exemplary Embodiments

In the first and second exemplary embodiments, the read/new arrival state is released in response to the user operation. However, a trigger for releasing the read/new arrival state may be a lapse of time without being limited to the user operation. For example, the job may be released from the new arrival state when a predetermined time has elapsed after inputting the print job. In other words, the print job may be handled as a newly-arrived job for the predetermined time after inputting the print job, and may be handled as a not-newly-arrived job after the predetermined time has elapsed. Here, a case where the predetermined time is set to "24 hours" and the user logs in on "2016/5/28 15:00", is specifically described using the print jobs illustrated in FIG. 8 as an example. In the above-described case, it is determined whether the job is a newly-arrived job based on, as a boundary, "2016/5/27 15:00" that is a date "24 hours" before "2016/5/28 15:00". Accordingly, jobs "CCC.doc" and "DDD.pptx" are handled as the newly-arrived jobs, and jobs "AAA.txt" and "BBB.pdf" are handled as the not-newly-arrived jobs. A length of the above-described predetermined time is preferably settable and changeable by the user.

In the first and second exemplary embodiments, the print data stored by the image forming apparatus 102 is managed by the bibliographic information table and the job state management table stored by the image forming apparatus 102. Alternatively, the information may be managed by not the image forming apparatus 102 but an external apparatus. For example, the exemplary embodiments may be applied to a pull-printing system in which the print data stored by a data server is downloaded to the image forming apparatus 102 based on the bibliographic information table stored by a management server and the downloaded print data is printed. In such a pull-printing system, the job state management table is preferably managed by the management server.

Further, in the first and second exemplary embodiments, the print job selection screen is displayed on the operation unit 207 provided in the image forming apparatus 102. However, the print job selection screen may be displayed on another display device. For example, the print job selection screen may be displayed on a display device of an information terminal (e.g., display device 406 of PC 101) that is connected to the image forming apparatus 102 through a network. In this case, the CPU 202 transmits the information of the first page including information of the newly-arrived job, to the external apparatus in step S904. Further, in step S906, the CPU 202 transmits the information of the specified page including the information of the newly-arrived job, to the external apparatus. Moreover, in step S1006, the CPU 202 receives the printing instruction from the external apparatus. Any method of displaying the print job selection screen on the external apparatus may be used. For example, the image forming apparatus 102 may provide the print job selection screen in a form of a web page, so that the external apparatus can access the web page. For example, a dedicated application may be installed in the external apparatus, and the external apparatus may generate the print job selection screen based on the job information transmitted from the image forming apparatus 102. The external terminal (information terminal) may be a mobile terminal.

One or more functions of the above-described exemplary embodiments can be realized by supplying a program to a system or an apparatus through a network or a storage medium, and reading and executing the program by one or more processors in a computer of the system or the apparatus. In addition, the one or more functions can also be realizable by a circuit (e.g., application specific integrated circuit (ASIC)).

The above-described exemplary embodiments can be applied to a system including a plurality of devices or an apparatus including one device.

The above-described exemplary embodiments are not limiting, and various modifications (including organic combinations of exemplary embodiments) can be made and are not eliminated from the scope of the present disclosure. In other words, combined configurations of the exemplary embodiments and the modifications thereof described above are all included in the present disclosure.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-134760, filed Jul. 10, 2017, which is hereby incorporated by reference herein in its entirety.

What is claimed is:

1. An image forming apparatus, comprising:
one or more processors; and
memory storing executable instructions, which when executed by the one or more processors, cause the image forming apparatus to:
register a first print job in association with a user;
store state information in association with the first print job, the state information associated with the first print job indicating that the first print job has not been subjected to a predetermined operation during a period after the first print job is registered until the first print job is printed;
display a list of print jobs associated with the user and a user interface object on a display, the print jobs in the list including one or more print jobs which have been subjected to the predetermined operation and one or more print jobs which have not been subjected to the predetermined operation, the user interface object enabling a user to collectively select the one or more print jobs which have not been subjected to the predetermined operation based on selection of the user interface object, the one or more print jobs which have not been subjected to the predetermined operation including the first print job;
receive one or more inputs indicating selection of the user interface object;
determine the one or more print jobs which have not been subjected to the predetermined operation from among the print jobs in the list based on respective state information stored in association with each of the print jobs in the list;
based on the selection of the user interface object, present the one or more print jobs which have not been subjected to the predetermined operation in a selected state and the one or more print jobs which have been subjected to the predetermined operation not in a selected state; and
perform printing based on the one or more print jobs in the selected state.

2. The image forming apparatus according to claim 1, wherein the executable instructions, when executed by the one or more processors, cause the image forming apparatus to:
display a setting screen including one or more user interface objects enabling a user to set the one or more print jobs which have not been subjected to the predetermined operation to be presented in a selected state automatically when the list of print jobs associated with the user is displayed.

3. The image forming apparatus according to claim 1, wherein the list of print jobs associated with the user is displayed based on the user being logged into the image forming apparatus.

4. The image forming apparatus according to claim 1, wherein the executable instructions, when executed by the one or more processors, cause the image forming apparatus to:
display a setting screen including one or more user interface objects enabling a user to set the one or more print jobs which have been subjected to the predetermined operation to be presented in a selected state automatically when the list of print jobs associated with the user is displayed.

5. The image forming apparatus according to claim 1, wherein the list of print jobs and a second user interface object are displayed on the display, the second user interface object enabling a user to collectively put the one or more print jobs which have been subjected to the predetermined operation into a selected state by selecting the second user interface object.

6. The image forming apparatus according to claim 1, wherein an icon is displayed as notification indicating the first print job has not been subjected to the predetermined operation.

7. The image forming apparatus according to claim 1, wherein the predetermined operation is an operation to display the list of print jobs.

8. The image forming apparatus according to claim 1, wherein the predetermined operation is an operation to select a print job from the list of print jobs.

9. The image forming apparatus according to claim 1, wherein the predetermined operation is an operation to perform a preview display of a print job.

10. The image forming apparatus according to claim 1, wherein the predetermined operation is selectable from a plurality of operations including displaying a print job in the list of print jobs, a selection from the list of print jobs, and a preview display of a print job.

11. A method for controlling an image forming apparatus, comprising:
registering a first print job in association with a user;
storing state information in association with the first print job, the state information associated with the first print job indicating that the first print job has not been subjected to a predetermined operation during a period after the first print job is registered until the first print job is printed;

displaying a list of print jobs associated with the user and a user interface object on a display, the print jobs in the list including one or more print jobs which have been subjected to the predetermined operation and one or more print jobs which have not been subjected to the predetermined operation, the user interface object enabling a user to collectively select the one or more print jobs which have not been subjected to the predetermined operation based on selection of the user interface object, the one or more print jobs which have not been subjected to the predetermined operation including the first print job;

receiving one or more inputs indicating selection of the user interface object;

determining the one or more print jobs which have not been subjected to the predetermined operation from among the print jobs in the list based on respective state information stored in association with each of the print jobs in the list;

based on the selection of the user interface object, presenting the one or more print jobs which have not been subjected to the predetermined operation in a selected state and the one or more print jobs which have been subjected to the predetermined operation not in a selected state; and performing printing based on the one or more print jobs in the selected state.

12. A non-transitory computer-readable storage medium storing a program for causing a computer to execute a method for controlling an image forming apparatus, the method comprising:

registering a first print job in association with a user;

storing state information in association with the first print job, the state information associated with the first print job indicating that the first print job has not been subjected to a predetermined operation during a period after the first print job is registered until the first print job is printed;

displaying a list of print jobs associated with the user and a user interface object on a display, the print jobs in the list including one or more print jobs which have been subjected to the predetermined operation and one or more print jobs which have not been subjected to the predetermined operation, the user interface object enabling a user to collectively select the one or more print jobs which have not been subjected to the predetermined operation based on selection of the user interface object, the one or more print jobs which have not been subjected to the predetermined operation including the first print job;

receiving one or more inputs indicating selection of the user interface object;

determining the one or more print jobs which have not been subjected to the predetermined operation from among the print jobs in the list based on respective state information stored in association with each of the print jobs in the list;

based on the selection of the user interface object, presenting the one or more print jobs which have not been subjected to the predetermined operation in a selected state and the one or more print jobs which have been subjected to the predetermined operation not in a selected state; and performing printing based on the one or more print jobs in the selected state.

* * * * *